Sept. 7, 1954     W. C. TROENDLE     2,688,201
INDEXING MEANS FOR PHOTOGRAPHIC SLIDES AND THE LIKE
Filed May 2, 1950
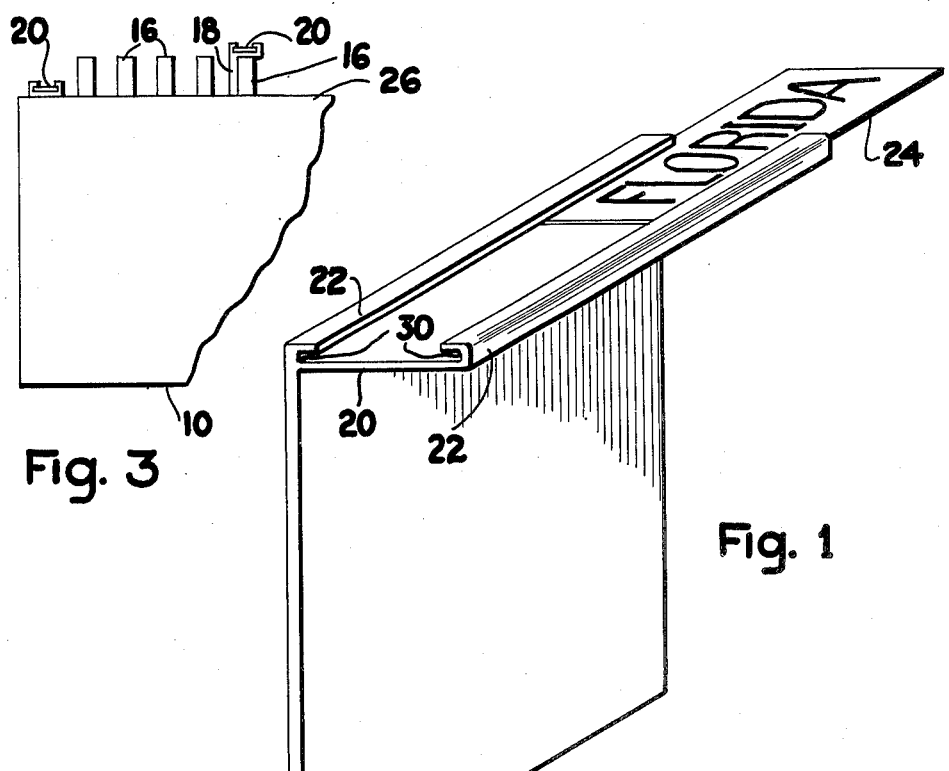
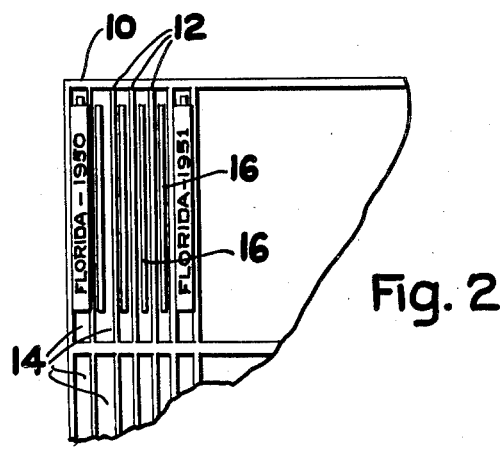
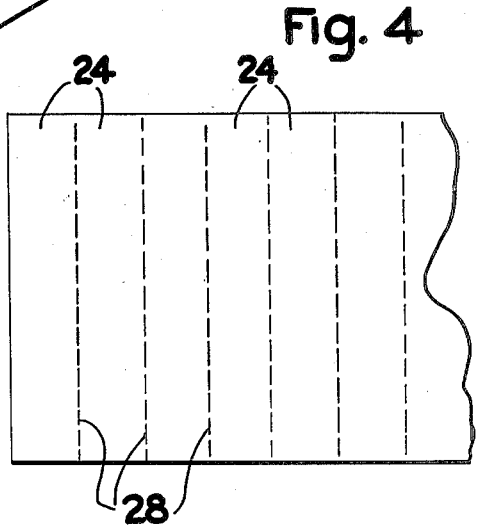
INVENTOR.
WM. C. TROENDLE Patented Sept. 7, 1954

2,688,201

UNITED STATES PATENT OFFICE 2,688,201

INDEXING MEANS FOR PHOTOGRAPHIC SLIDES AND THE LIKE

William C. Troendle, Gardner, Mass.

Application May 2, 1950, Serial No. 159,568

1 Claim. (Cl. 40—16)

This invention relates to new and improved indexing means particularly adapted for storing and carrying cases and the like for photographic transparencies, slides, etc.

The principal object of the present invention resides in the provision of a novel device adapted to be inserted in a slide box or carrying case along with the slides and having a flange or the like thereon and integral therewith, said flange having means for securing a title or indexed tab thereto, whereby said flange may overlie an edge of a slide or transparency in the case and clearly show the title or identification in direct contiguous relation to the slide or slides so identified; or the device may be used in the same way but indicating a group of slides, the device in all cases being easily removable and reinsertable in the box or case so that it may be changed as desired at any time, and also the title tabs, although held in the device in clearly readable relation to the slides, are removable and replaceable as desired.

Other objects and advantages of the invention will appear hereinafter.

Reference is to be had to the accompanying drawings in which

Fig. 1 is a perspective view of a device according to the present invention;

Fig. 2 is a top plan view of a part of a slide case illustrating the construction thereof and the mode of use of the present invention therein;

Fig. 3 is a view in side elevation of the device of Fig. 2; and

Fig. 4 illustrates the tabs.

The conventional slide case or container comprises a box 10 having a series of partitions 12 forming a series of narrow compartments 14 each of which is adapted for the reception of a transparency or slide 16, these slides being received in the compartments relatively loosely for easy removal and insertion.

The present invention comprises a thin, lightweight sheet generally indicated at 18 with an integral flange at one side edge thereof as at 20, this flange 20 being provided with facing lips 22 as clearly shown in Fig. 1, these lips forming a guideway from end to end of the flange 20.

It is preferred that the sheet-like portion 18 be approximately two inches wide and an inch and three-quarters high. Of course, the invention is not intended to be limited to these measurements, but they are such as to lend the most practicable use to the device for the purpose described.

It is also preferred that the device be made of a clear lightweight plastic or similar material which may be extruded in elongated condition and cut off to the two inch length, or any other length desired.

The reason for the dimensions stated above resides in the fact that the photographic transparencies are two inches by two inches. Therefore, the compartments 14 must be at least two inches long and this provides for a two-inch identifying tab 24 to be slid into the guideway on the flange 20.

At the same time the height of the device being less than two inches ensures that the flange 20 will not extend above the slides so as to become damaged by the cover that may be provided for the box 10.

It will be seen in Fig. 3 that in some cases the slides 16 will extend above the top edge 26 of the box 10, in which case the flange 20 will rest on the tops of the slides 16 as shown; or where the device is placed in its own slot or compartment with no slide under it, the new indexing device will assume the position shown at the left hand end of Fig. 3. However, in either case the notation on the two-inch tab 24, which may be typewritten, is clearly readable.

The flange 20 may be made just wide enough to cover a single compartment 14 in which case there may be a title made for each slide in the entire box. However, in most cases, it will not be necessary to have a title for each slide but merely a title for each group of slides since there will usually be a half dozen to twenty slides concerning a single subject matter.

As shown in Fig. 4, the tabs 24 are preferably provided in a length having transverse perforations 28 so that the tabs may be torn off one at a time leaving rough edges thereon occasioned by the perforations 28. These rough edges are just far enough apart to snugly fit against the inside edges 30 of the guideways 22 and, therefore will not shake out accidentally but will be lightly held in the guideways as long as is desired, but are easily removable to be replaced by a different title.

It will be seen that this invention provides an extremely simple and inexpensive index and title means for transparencies and slides. These indexes and titles are very easily read and, of course, accurately indicate the slides intended without the necessity of referring to the conventional type of index usually printed in the cover of the slide case. Those familiar with these conventional indexes will realize how difficult it is to arrange the slides according to such inflexible indexing means, as compared with the present invention wherein the indexes are easily movable with the slides from one group to another as desired, and which point out the slides in contiguous relation thereto.

Having thus described my invention and the advantages thereof, I do not wish to be limited to the details herein disclosed otherwise than as set forth in the claim, but what I claim is:

In combination with a slide carrying case including a plurality of narrow compartments each of which is adapted to receive a transparency, a slide indexing means comprising a thin flat body member receivable in a compartment, a flange on an edge of said body member, and tab retaining means on the flange, said flange being of a size to substantially cover a single compartment.

References Cited in the file of this patent

UNITED STATES PATENTS

| Number | Name | Date |
|---|---|---|
| 321,384 | Presley | June 30, 1885 |
| 884,573 | Detmers | Apr. 14, 1908 |
| 1,211,672 | Cain | Jan. 9, 1917 |
| 1,294,948 | Rand | Feb. 18, 1919 |
| 1,329,569 | Yaxley | Feb. 3, 1920 |
| 1,442,056 | Edmonds | Jan. 16, 1923 |
| 1,512,395 | Brigel | Oct. 21, 1924 |
| 1,531,166 | Williams | Mar. 24, 1925 |
| 1,730,007 | Hemenway | Oct. 1, 1929 |
| 2,168,912 | Meyer | Aug. 8, 1939 |
| 2,547,239 | Walker | Apr. 3, 1951 |

FOREIGN PATENTS

| Number | Country | Date |
|---|---|---|
| 519,971 | Great Britain | Apr. 10, 1940 |